United States Patent
Pittroff et al.

[11] Patent Number: 6,105,631
[45] Date of Patent: Aug. 22, 2000

[54] PREPARATION OF HOMOGENEOUS GAS MIXTURES WITH $SF_6$

[75] Inventors: Michael Pittroff, Hannover; Hans-Peter Wickel; Reiner Distel, both of Bad Wimpfen; Heinz-Joachim Belt, Burgwedel, all of Germany

[73] Assignee: Solvay Fluor und Derivate GmbH, Hannover, Germany

[21] Appl. No.: 09/319,016

[22] PCT Filed: Nov. 19, 1997

[86] PCT No.: PCT/DE97/02710

§ 371 Date: Aug. 3, 1999

§ 102(e) Date: Aug. 3, 1999

[87] PCT Pub. No.: WO98/23363

PCT Pub. Date: Jun. 4, 1998

[30] Foreign Application Priority Data

Nov. 28, 1997 [DE] Germany ............ 196 49 254

[51] Int. Cl.[7] .................................................. B65B 1/04
[52] U.S. Cl. .................. 141/3; 141/9; 141/100; 141/3; 222/145.1
[58] Field of Search ............... 141/2, 3, 4, 9, 141/192, 198, 100, 40, 52, 65, 95; 222/145.1, 145.5

[56] References Cited

U.S. PATENT DOCUMENTS 4,734,371 3/1988 Schmolke et al. .
5,137,047 8/1992 George ............................ 137/240
5,356,533 10/1994 Nakagawa .
5,451,104 9/1995 Kleen et al. .
5,904,190 5/1999 Patel .............................. 141/198

FOREIGN PATENT DOCUMENTS

3515072 A1 11/1986 Germany .
4126397 C2 2/1993 Germany .
4316113 A1 11/1993 Germany .
436 176 5/1965 Switzerland .
WO 88/08743 11/1988 WIPO .

*Primary Examiner*—Steven O. Douglas
*Attorney, Agent, or Firm*—Evenson, McKeown, Edwards & Lenahan, P.L.L.C.

[57] ABSTRACT

Homogeneous compressed gas mixtures with $SF_6$ and a gas with a density at least 4 grams per liter lower can be prepared by using a mixing station with at least the following elements: a gas premixer in which the separate gases are brought together; a static mixer and/or a buffer tank connected thereto; a compressor connected to the buffer tank or static mixer; and when a buffer tank is used, a return line from the compressor output to the buffer tank. Mixtures of $SF_6$ and $N_2$, useful for example as insulating gas for current conducting underground cables, can be produced by this process, which is capable of processing large flow rates. Mass flowmeters ensure high precision and reliability. Also disclosed is a mobile mixing station for implementing this process.

17 Claims, 2 Drawing Sheets

PREPARATION OF HOMOGENEOUS GAS MIXTURES WITH SF$_6$

BACKGROUND OF THE INVENTION

The invention relates to a method for the preparation of essentially homogeneous, compressed gas mixtures with SF$_6$, and to a mixing station, particularly a mobile mixing station, which can be used for this purpose.

In principle, separate gases can be converted into a homogeneous gas mixture by transferring the gases into a container and waiting for a sufficiently long period of time, until a corresponding homogeneous gas mixture is formed by diffusion. However, since extremely long times are required for this purpose, such a method cannot be used industrially. Of course, mixing is also observed when gas streams are passed into a stationary mixer and/or into a common pipeline. In such a case however, mixing is not always so thorough, that the mixtures achieved can be considered to be "homogeneous", especially if gases of greatly different densities, such as those containing SF$_6$, are to be mixed. Such a gas mixture is the mixture of SF$_6$ (sulfur hexafluoride) and N$_2$ (nitrogen). As a gas, SF$_6$ has a density of 6.18 g/l and N$_2$ a density of 1.170 g/l, in each case determined at a temperature of 15° C. and a pressure of 1 bar absolute (normal conditions in the sense of this application). Such gas mixtures are used, for example, as an insulating gas for underground cables carrying a current. In this connection, it is a particular problem that the gas mixtures (which are required in large quantities) expediently must be prepared on site. If namely gas mixtures, pre-fabricated in a factory, are to be used, these mixtures would have to be transported in gas cylinders under a high pressure in order to keep the transporting costs as a low as possible; however, this is not possible, since a portion of the SF$_6$ would then condense and corresponding demixing would occur.

SUMMARY OF THE INVENTION

It is an object of the present invention to provide a method with which homogeneous, compressed gas mixtures of SF$_6$ and other gases, the density of which is very different, can be produced. It is moreover an object of the present invention to provide a mixing station, which can be used for this purpose, especially a mobile mixing station, which can be used for this purpose. Yet another object of the invention is to provide a mixing station, which is protected against the effects of dirt and weather. These objectives are accomplished by the inventive method and/or the inventive mixing station.

For the inventive method of producing essentially homogeneous compressed gas mixtures of separate gases, one gas being SF$_6$, and the other gas or gases having a density, which under normal conditions is at least 4 g/l below that of the SF$_6$, the separate gases are pre-mixed with formation of an inhomogeneous gas mixture, the inhomogeneous gas mixture is passed into a static mixer and/or a buffer tank, the gas mixture is passed from the buffer tank or the static mixer into a compressor, which delivers an essentially homogeneous, compressed gas mixture. If a buffer tank is provided, a portion of the essentially homogeneous, compressed gas mixture, which is delivered by the compressor, is returned via a return line into the buffer tank.

The inventive method makes it possible to produce homogeneously mixed gas mixtures at the site of use. It is therefore no longer necessary to supply homogeneously mixed gas mixtures from the factory. It is a further advantage that high rates of flow (for example, greater than 200 Nm$^3$ per hour!) can be handled; at the same time, the degree of mixing is independent of the cross section of the pipelines used. The metered delivery of the finished, homogeneous gas mixture is possible.

If a static mixer and a buffer tank are provided, it is advantageous to pass the gas initially through the static mixer and then through the buffer tank.

In accordance with a preferred embodiment, the method is carried out using a buffer tank, and a control valve is installed in the return line. With this control valve, the return of a portion of the gas mixture is adjusted to the desired value. This embodiment has the advantage that the compressor can be run under a gas ballast load and, in addition, the mixing is improved even further. The control valve can be adjusted, for example, so that a specified portion of the volume of compressed gas, delivered by the compressor, is returned.

Advantageously, a safety device is provided, which notes when the power cable or the gas cylinder, which is to be filled, has been filled to the limit and switches off the compressor. It may be, for example, a pressure relief valve, which opens up at a given pressure and appropriately switches the compressor off. The excess pressure pipeline can be connected with the buffer tank. In this way, the gas which is released remains in the circuit.

Preferably, the inventive method can be used for producing mixtures of gases, which have a large difference in densities of at least 4.5 g/l. The method is particularly suitable for producing homogeneous gas mixtures, which contain or consist of SF$_6$ and N$_2$. Such gas mixtures are used, for example, as insulating gases for underground cables carrying a current.

The compressor is adjusted so that it supplies a gas mixture with the desired pressure. Gas mixtures of SF$_6$ and nitrogen, which are to be employed for said use as an insulating gas in underground cables, are advantageously supplied with a pressure of 1 to 13 bar absolute. In particular, the pressure ranges from 7 to 13 bar absolute.

Compressors, which operate oil-free, especially diaphragm compressors, but also piston compressors, are advantageously used.

The amounts of gases, which are supplied in order to form gas mixtures of a particular composition, are controlled preferably by mass flowmeters. This is advantageous especially for gases with greatly differing densities; the gas mixtures can be controlled accurately in spite of variable temperatures (effects of the time of day or year).

The inventive method is particularly suitable for producing essentially homogeneous, compressed gas mixtures, which contain 3 to 50, preferably 3 to 20, percent by volume of SF$_6$, the remainder up to 100 vol.-% being N$_2$. Preferably, the desired SF$_6$ content in a withdrawn sample does not deviate by more than ±0.7 percent by volume from the value existing in an ideal mixture. If necessary, the proportion of already mixed gas, returned via the return pipeline into the buffer tank, is increased. The analysis can be carried out, for example, by gas chromatography.

For a preferred embodiment of the inventive method, a gas mixture, containing or consisting of SF$_6$ and nitrogen, is produced and introduced as insulating gas into a current-carrying underground cable.

A further object of the invention is a mixing station, which can be used for carrying out the inventive method of producing gas mixtures of SF$_6$ and significantly lighter gases. This mixing station has the following components: at least 2 pipelines for supplying the gases that are to be mixed; a gas pipeline for passing on the pre-mixed gases together; a stationary mixer and/or a buffer tank, into which the gas pipeline, which passes on the pre-mixed gases together, discharges; a gas pipeline which is connected with the buffer tank or the stationary mixer and a compressor, through which pipeline a gas mixture is passed from the buffer tank or the stationary mixer into the compressor; a compressor, in which the gas mixture, diverted from the buffer tank or the stationary mixer, is compressed and homogenized; a removal pipeline for drawing off the homogeneously compressed gas mixture from the compressor; if a buffer tank is present, a return pipeline which is connected with the removal pipeline from the compressor and with the buffer tank; a control valve in the return line. The supplying pipelines of the gases that are to be mixed can be connected via a tee with the gas pipeline for passing the gases on together. A preferred embodiment of the mixing station has a buffer tank and a return line with a control valve.

BRIEF DESCRIPTION OF THE DRAWINGS

The invention will be described in further detail with reference to preferred embodiments illustrated in the accompanying drawings in which.

DESCRIPTION OF PREFERRED EMBODIMENTS

Figure 1:
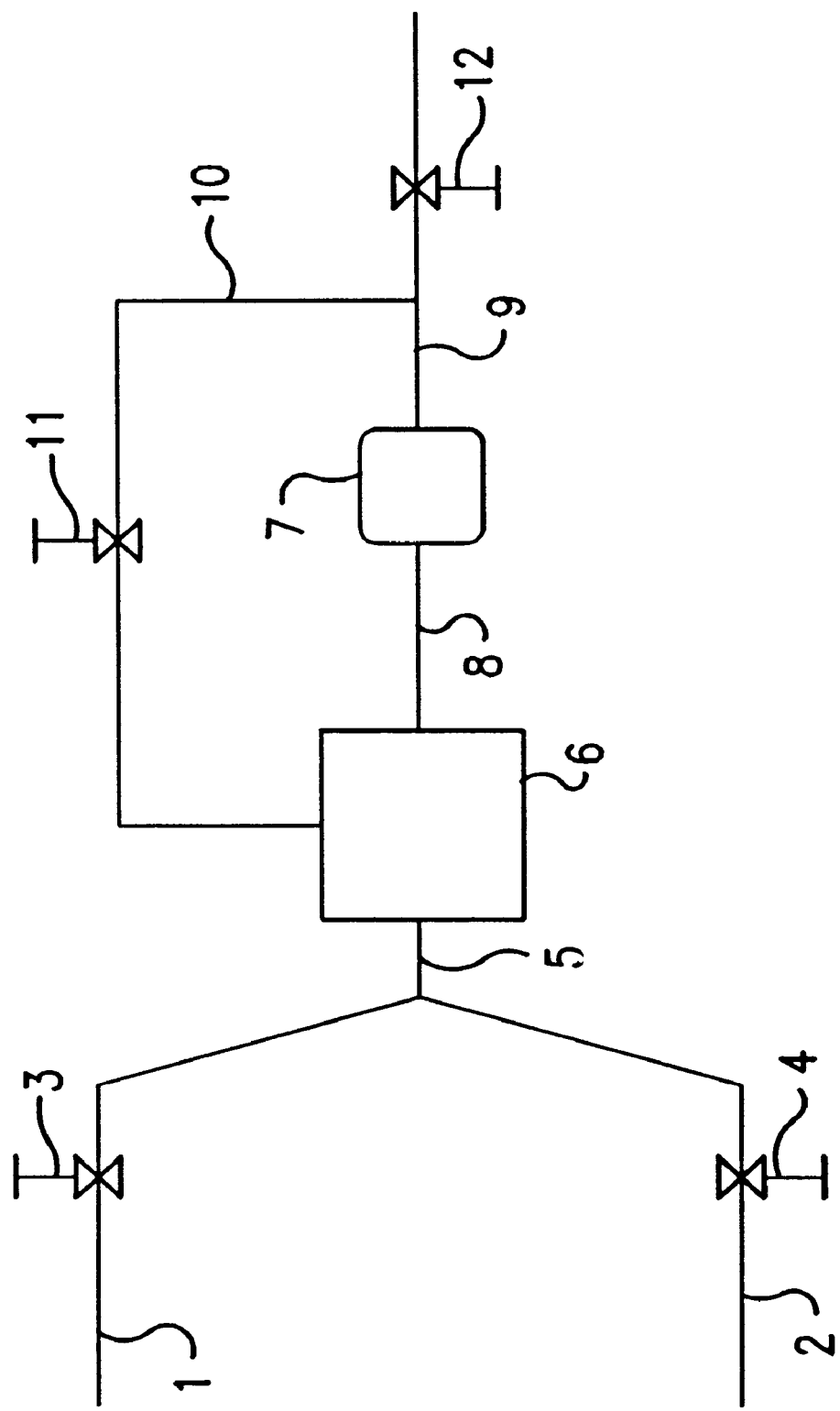
FIG. 1 is a schematic illustration of a simple mixing station according to the invention.

FIG. 1 shows a simple mixing station which comprises:
2 feed pipelines (1, 2); 2 valves (3, 4) for regulating the amount of gas flow; gas pipeline (5) for passing on the pre-mixed gases; a buffer tank (6); a compressor (7); a gas pipeline (8) between the buffer tank (6) and the compressor (7); a removal pipeline (9); a return pipeline (10) between the buffer tank and the compressor; a control valve (11) in the return line; a valve (12) for regulating the amount of homogenous gas mixture removed.

The mixing station may have further useful components, such as one or more manometers, pressure reducers, flowmeters, pressure relief valves, automatic cut-off devices for the compressor, sampling sites or a site for tapping the homogeneous gas mixture. It is particularly advantageous if the apparatus has mass flowmeters, for regulating the amounts of gases. In spite of high gas density differences, such an apparatus provides exact results independently of the temperature (time of day, time of year) at which it is operated.

The mixing station can be constructed as a mobile unit. It comprises then the above-described mixing station and an undercarriage, on which the mixing station is mounted. For example, the undercarriage can be a truck or the trailer of a truck. This has the advantage that the mixing station can be moved to meet the requirements of laying the underground cable that is to be insulated.

The mixing station furthermore may comprise: at least one holding device for accommodating gas cylinders of one or more of the unmixed gases; connections for connecting a gas cylinder, which is to be filled with the homogeneous, compressed gas mixture; at least one holding device for such a gas cylinder.

Moreover, it may have means for protection against external influences. For example, it may be provided with a superstructure with an awning, which protects it against dirt and the effects of weather.

Figure 2:
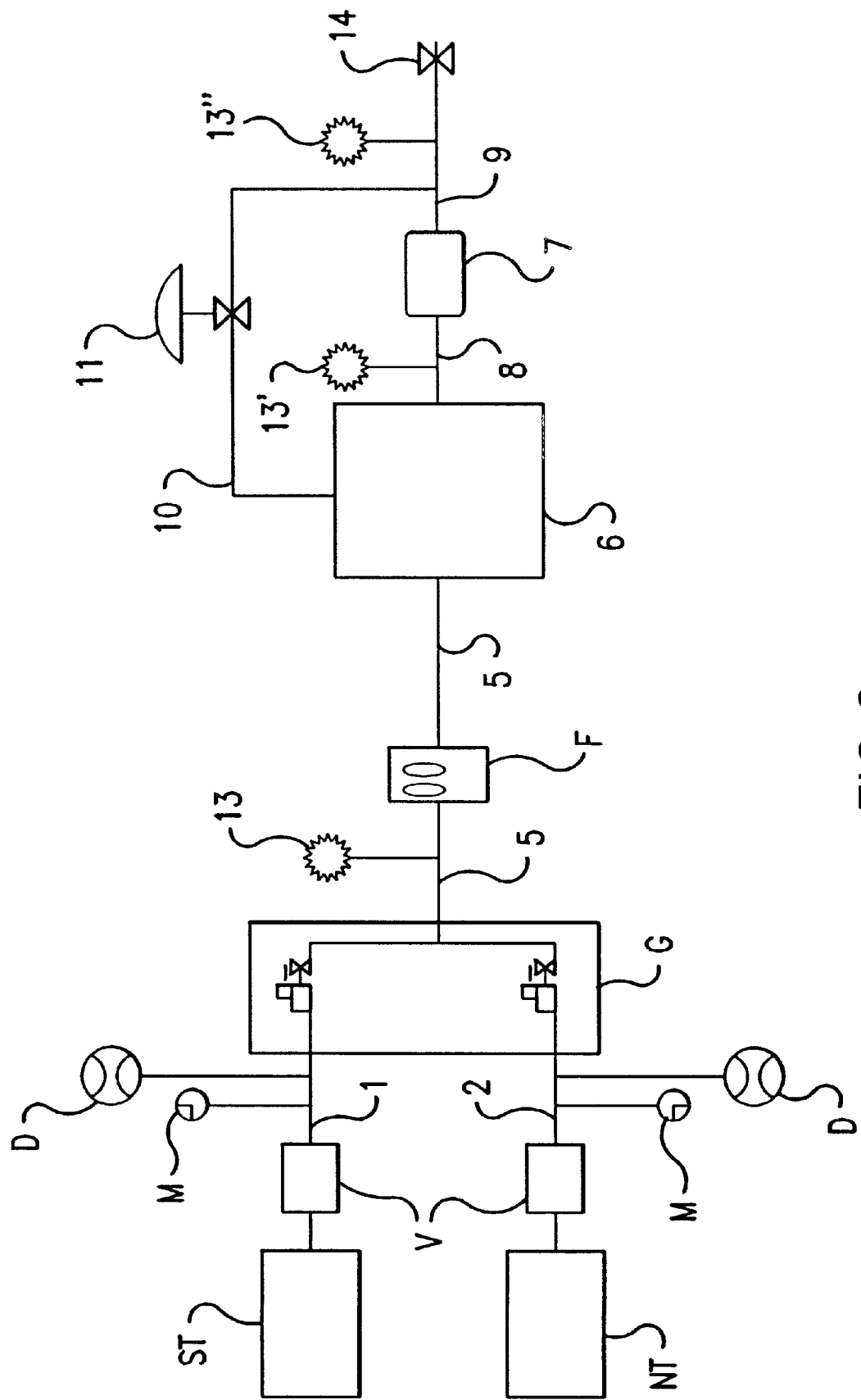
FIG. 2 is a schematic illustration of an apparatus for carrying out the method of the invention.

The inventive method is explained further with reference to FIG. 2/2. Sulfur hexafluoride and nitrogen are passed from the sulfur hexafluoride tank ST or the nitrogen tank NT via the evaporator V, manometer M and pressure reducer D into a gas mixer G. The pressure between the manometer and the pressure reducer is 9 to 15 bar. In the gas mixer, the two gases are introduced through mass flowmeters and regulating valves into a common pipeline 5. The pressure difference between M and the static mixer F is at least 3 bar. The pre-mixed gas is passed via the static mixer F into the buffer tank 6 and from the buffer tank via pipeline 8 into the compressor 7. A portion of the gas, taken from the compressor via the pipeline 9, is returned via the pipeline 10 and the control valve 11 to the buffer tank. The pressure in the pipeline 9 is up to 13 bar (that is, 14 bar absolute). Gas samples can be taken for analysis at sampling sites 13, 13' and 13". The amount flowing through pipeline 9 is 5 to 250 Nm$^3$/h. A homogeneous gas mixture is filled through pipeline 9 into a gas cylinder, which is not shown here. The control valve 11 is adjusted so that the desired degree of mixing is achieved—the greater the portion of volume flowing back, the more ideal is the mixing and, of course, the smaller is the amount of compressed gas mixture that is delivered. The compressed gas is delivered via the shutoff valve 14 to the object that is to be filled (such as a power cable or a pressurized gas cylinder).

The amounts flowing out of the sulfur hexafluoride tank and the nitrogen tank are regulated so that the ratio by volume of sulfur hexafluoride to nitrogen is precisely 5:95. A gas sample was taken at sampling site 13, analyzed and shown by analysis to contain 6.7 percent by volume of sulfur hexafluoride and 93.3 percent by volume of nitrogen. This indicates that mixing is still incomplete. Samples, which were taken directly behind the gas buffer tank and from the gas cylinder, in each case contain 5 percent by volume of sulfur hexafluoride and 95 percent by volume of nitrogen and are proof of optimum mixing.

The experiment was repeated with the ratio by volume of sulfur hexafluoride to nitrogen being adjusted to 15:85. A sample, taken directly behind the gas mixer, contained 16.7 percent by volume of sulfur hexafluoride and 83.3 percent by volume of nitrogen. A sample, drawn behind the buffer tank, contained 15.7 percent by volume and a sample, taken from the gas cylinder, contained 15.8 percent by volume of sulfur hexafluoride. The deviation from the ideal value of 15 percent by volume is attributed to the fact that the gas mixer had been operated at the limit of its capabilities and, for this reason, the ratio by volume of sulfur hexafluoride to nitrogen, in spite of the nominal adjustment to 15:85, effectively was approximately 15.7:84.3, and thus the mixing was ideal.

What is claimed is:

1. A method of producing a substantially homogeneous compressed gas mixture consisting of sulfur hexafluoride and nitrogen, said method comprising the steps of:

pre-mixing sulfur hexaf luoride and nitrogen from separate sources to form an inhomogeneous gas mixture;

passing the inhomogeneous gas mixture through a static mixer to a buffer tank;

introducing inhomogeneous gas mixture from said buffer tank into a compressor and compressing the gas mixture in said compressor to form a substantially homogeneous compressed gas mixture; and recycling a portion of said essentially homogeneous compressed gas mixture from the compressor to said buffer tank;

said substantially homogeneous compressed gas mixture containing from 3 to 50 volume percent of sulfur hexafluoride and the balance being nitrogen, and said compressed gas mixture being sufficiently homogeneous that the a sample withdrawn from said gas mixture will have a composition within ±0.7 volume percent of an ideal mixture of the sulfur hexafluoride and nitrogen.

2. A method according to claim 1, wherein said substantially homogeneous compressed gas mixture contains from 3 to 20 volume percent of sulfur hexafluoride, the balance being nitrogen.

3. A method according to claim 1, wherein said compressed gas mixture has a pressure of up to 13 bar.

4. A method according to claim 1 wherein said compressor is an oil-free operating compressor.

5. A method according to claim 1, wherein said compressor is a piston compressor or a diaphragm compressor.

6. A method according to claim 1, wherein the recycled portion of said compressed gas mixture is passed through a control valve which regulates the proportion of said compressed gas mixture which is recycled to the buffer tank.

7. A method according to claim 1, further comprising the step of introducing the substantially homogeneous compressed gas mixture as an insulating gas into a current-carrying underground cable.

8. A method according to claim 1, further comprising the step of regulating the amounts of sulfur hexafluoride and nitrogen introduced into said premixing step by mass flowmeters.

9. A method according to claim 1, wherein said method is carried out in a mobile mixing station.

10. A mixing station for producing a substantially homogeneous mixture of sulfur hexafluoride and nitrogen, said mixing station comprising a first gas line for conveying sulfur hexafluoride from a $SF_6$ source to a premixing point; a second gas line for conveying nitrogen from a $N_2$ source to said premixing point; a static mixer; a gas line for conveying a gas premixture from said premixing point to said static mixer; a buffer tank; a gas line for conveying a gas mixture from said static mixer to said buffer tank; a compressor for compressing and homogenizing a gas mixture; a gas line for conveying a gas mixture from said buffer tank to said compressor; a discharge for discharging a compressed and homogenized gas mixture from said compressor; a recycle line connected between said compressor discharge and said buffer tank for recycling a portion of the compressed and homogenized gas discharged from said compressor to said buffer tank, and a control valve connected to said recycle line for regulating the proportion of the compressed and homogenized gas discharged from said compressor which is recycled to said buffer tank.

11. A mixing station according to claim 10, wherein said SF6 and N2 sources comprise gas cylinders, further comprising at least one holding device for accommodating said gas cylinders; a connector on said discharge for connecting said discharge to a receptacle for receiving the substantially homogeneous compressed gas mixture, and a holder for holding said receptacle.

12. A mixing station according to claim 10, further comprising at least one device selected from the group consisting of manometers, pressure reducers, flowmeters, and sampling sites for withdrawing samples.

13. A mixing station according to claim 10, further comprising a mass flowmeter associated with each of said first and second gas lines for regulating the conveyance of gases to said premixing point.

14. A mixing station comprising a mixing station according to claim 10, mounted on a mobile undercarriage, whereby said mixing station is rendered mobile.

15. A mixing station according to claim 14 wherein said mobile undercarriage is a truck.

16. A mixing station according to claim 10 further comprising means for shielding said mixing station from external influences.

17. A mixing station according to claim 16, wherein said shielding means comprise a superstructure surrounding said mixing station and an awning mounted on said superstructure.

* * * * *